United States Patent
Sanders et al.

(10) Patent No.: US 7,855,525 B2
(45) Date of Patent: Dec. 21, 2010

(54) METHOD FOR CONTROLLING A HOLDING FORCE AGAINST, AND LIMITING IMPACT WITH TRAVEL LIMIT POSITIONS

(75) Inventors: Stephen P. Sanders, Millington, MI (US); Joyce D. Carsey, Swartz Creek, MI (US); Lawrence D. Hazelton, Goodrich, MI (US); Jos Lang, Bertrange (LU); Frederic Jacquot, Thionville (FR); Thomas W. Newman, Flint, MI (US)

(73) Assignee: Delphi Technologies, Inc., Troy, MI (US)

( * ) Notice: Subject to any disclaimer, the term of this patent is extended or adjusted under 35 U.S.C. 154(b) by 332 days.

(21) Appl. No.: 11/928,718

(22) Filed: Oct. 30, 2007

(65) Prior Publication Data
US 2009/0108793 A1 Apr. 30, 2009

(51) Int. Cl.
*G05D 3/00* (2006.01)
(52) U.S. Cl. .................. 318/466; 318/280; 318/283
(58) Field of Classification Search ............. 318/466, 318/468, 609, 610, 280, 283
See application file for complete search history.

(56) References Cited

U.S. PATENT DOCUMENTS

| | | | | |
|---|---|---|---|---|
| 4,579,012 A | * | 4/1986 | Mabie et al. | 74/89.34 |
| 4,663,892 A | * | 5/1987 | Smith | 451/49 |
| 5,672,945 A | * | 9/1997 | Krause | 318/434 |
| 6,118,271 A | * | 9/2000 | Ely et al. | 324/207.17 |
| 6,864,788 B2 | | 3/2005 | Crawford et al. | |
| 7,053,583 B1 | | 5/2006 | Hazelton | |
| 2005/0000580 A1 | * | 1/2005 | Tranovich et al. | 137/625.65 |
| 2006/0197481 A1 | * | 9/2006 | Hotto et al. | 318/280 |

* cited by examiner

*Primary Examiner*—Rina I Duda
(74) *Attorney, Agent, or Firm*—Larry Hazelton (57) ABSTRACT

An actuator includes a motor operated by a controller through a pulse width modulation drive signal applied to a drive circuit that drives the motor. The actuator has an output shaft connected to a coupling structure for manipulating a device such as a variable geometry turbine (VGT) or an exhaust gas recirculation (EGR) valve. The device has a range of motion limited by first and second mechanical stops located at opposing low and high ends of the range. The controller learns the location of the mechanical stops during calibration. An external control unit transmits a desired position to the actuator. A protocol allows the external control unit to implicitly request a positioning mode by virtue of what value range the desired position falls into. The controller is configured to limit the drive signal to a non-harmful level when one of the positioning modes calls for pushing the device against one of the stops.

15 Claims, 4 Drawing Sheets

METHOD FOR CONTROLLING A HOLDING FORCE AGAINST, AND LIMITING IMPACT WITH TRAVEL LIMIT POSITIONS

TECHNICAL FIELD

This invention relates generally to a method for operating an actuator, and more particularly to a method for controlling a holding force against travel limit positions.

BACKGROUND OF THE INVENTION

It is known to provide a so-called Smart Remote Actuator (SRA), which is an electro-mechanical device that is configured to actuate or manipulate an attached device, such as for example an engine feature like a position of a variable geometry turbocharger (VGT) or a position of an exhaust gas recirculation (EGR) valve. In one construction, the SRA includes a brushless direct current (BLDC) motor, whose rotor is coupled to a gear-train, which in turn is coupled to an output shaft. The output shaft of the SRA is configured to be coupled by way of intermediate linkage such as a second gear train or a lever-connecting rod-lever combination or the like to transfer the rotation of the output shaft to a desired movement of the manipulated device (e.g., rotation of an EGR valve throughout its operating range). The SRA may include integrated rotary position detection hardware/software that is configured to provide an indicated position of the actuator as feedback.

It is known to use an SRA in a VGT application. In this application, the actuator operates the VGT over a range of travel that avoids physical contact with the mechanical travel limits, except when those travel limits are deliberately contacted for the purpose of learning their locations. For this application, not contacting the travel limits was acceptable. However, for other applications, such as an EGR valve application, the precision needed required that the mechanical travel limits sometimes be contacted, perhaps for indefinite periods of time. A problem with contacting the mechanical travel limits, especially for extended periods of time, is that the phase currents provided to the motor would overheat the motor and perhaps damage it. This is due in part to the characteristics of the motor. In operation, when the rotor is rotating, a back electromagnetic force (BEMF) is produced which tends to reduce the amount of current that flows through the coils for a given applied voltage. However, in a stall condition, as would exist when contacting a travel limit, only the resistance of the coils themselves (generally low) impedes current flow, which can result in an excessive current situation. It is this excessive current that produces undesirable amounts of heat—potentially damaging the motor and/or associated packaging/components.

There is therefore a need for a method for controlling a holding force against travel limit positions that minimizes or eliminates one or more of the problems noted above.

SUMMARY OF THE INVENTION

The present invention provides a method of controlling the operation of a motor-based actuator so as to achieve overtemperature protection when the actuator is causing the manipulated device to apply a force ("push") against one of the mechanical stops ("travel limits").

The invention is directed to a method of operating an actuator having a motor where the actuator is coupled to a manipulated device, such as an EGR valve or the like. The manipulated device is configured to travel through a range of motion limited by first and second mechanical stops located at opposing low and high ends of such range. The method includes a number of steps. The first step involves determining an error signal as a difference between a commanded actuator position and a present (e.g., sensed) actuator position. Next, determining a candidate level of a drive signal for driving the motor as a function of the determined error signal and a predetermined control strategy. The final step involves limiting the candidate level of the drive signal level so as to not exceed a predetermined maximum level when a holding force limit flag is set. The predetermined maximum level corresponds to a predetermined holding force of the manipulated device against one of the mechanical stops. The limiting step restricts the current through the motor coils when "pushing" against a mechanical stop.

The method also provides a mechanism for an external control unit to encode in its desired position command to the actuator, a request for one of a plurality of positioning modes. This mechanism allows the actuator to distinguish between an external request to cause the manipulated device to push against one of mechanical stops, on the one hand, versus an external request to simply position the manipulated device at one of the mechanical without applying a force ("pushing").

In another aspect of the present invention, a method of operating the actuator is provided that minimizes or eliminates excessive impact of the manipulated device against the mechanical stops due to rotational inertia built up when responding to relatively large changes in the commanded position that takes the manipulated device into the stop.

Other features of the method as well as a system are also presented.

BRIEF DESCRIPTION OF THE DRAWINGS

The present invention will now be described by way of example, with reference to the accompanying drawings.

DETAILED DESCRIPTION OF THE PREFERRED EMBODIMENT

Figure 1:
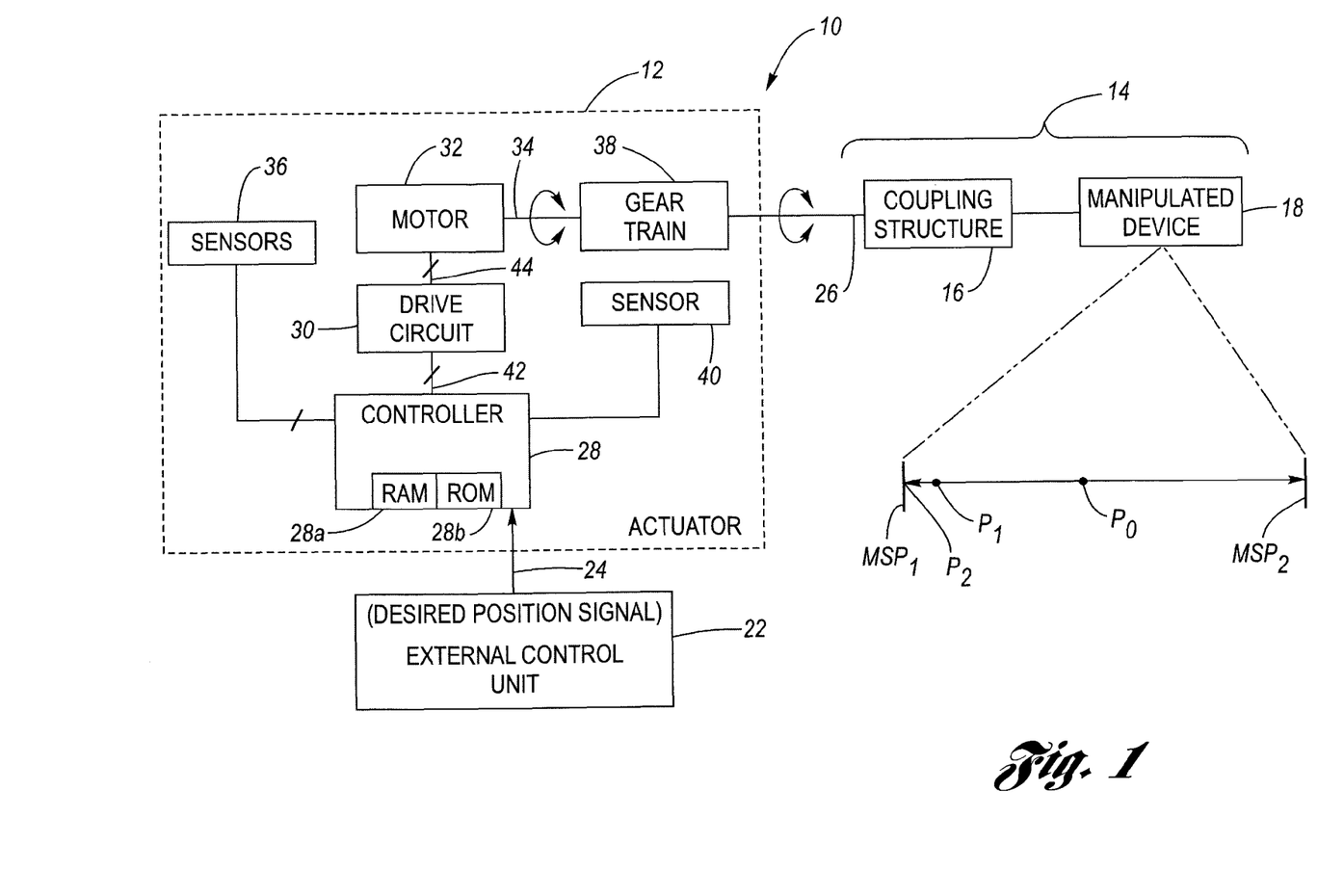
FIG. 1 is a schematic and block diagram of a smart remote actuator system having a holding force limit feature.

Referring now to the drawings wherein like reference numerals are used to identify identical components in the various views, FIG. 1 is simplified schematic and block diagram view of a system 10 that includes a smart remote actuator (SRA) 12 coupled to a load 14 configured to be actuated by SRA 12. In the illustrated embodiment, the load 14 includes a coupling structure 16 and a manipulated device 18. As described in the Background, the manipulated device 18 may take the form a variable geometry turbine (VGT), an exhaust gas recirculation (EGR) valve, or any other device that has a range of travel 20 between and limited by a first mechanical stop $MSP_1$ and a second mechanical stop $MSP_2$ where the first and second mechanical stops are located at opposing low and high ends of such range of travel 20. The present invention will find particular utility in those applications where it is desired or required that the manipulated device (e.g., an EGR valve) not only contact one of the mechanical stops but also apply a holding force against the mechanical stop (travel limit) as well. It is in these situations where the methodology of the present invention is effective at providing over-temperature protection to the SRA 12. It should be understood that the present invention is not limited to only two stop configurations, although this configuration will be the most common (i.e., it is contemplated that the aspect of the invention involving limitation on the holding force can be applied to just one stop as well). As shown in FIG. 1, the device 18 may assume a number of positions within the travel range 20, designated by points $P_0$, $P_1$ and $P_2$.

In general terms, an external control unit 22 is configured to transmit a desired position signal 24 to the SRA 12. The desired position signal 24 is indicative of a desired position that the control unit wants the manipulated device 18 to assume within the travel range 20. In an automotive vehicle application, the control unit 22 may be an electronic engine controller. The SRA 12 is configured to process the desired position signal 24, as more fully described below, and cause an output shaft 26 thereof to rotate. Such rotation, which may be either clockwise or counter-clockwise, is coupled through the coupling structure 16 to effect movement of the device 18 toward the desired position, as indicated by signal 24. As known, the coupling structure 16 may comprise a gear, a gear train, movable bars or other mechanical linkages appropriate for the target application to translate the movement of the output shaft 26 to a corresponding movement of the manipulated device 18.

As to internal construction, the SRA 12 includes a controller 28, a drive circuit 30, a motor such as a brushless direct current (BLDC) motor 32 having a rotating rotor 34, a motor position sensor block 36, a gear train 38 and a gear train position sensor 40.

The controller 28 is configured generally to execute preprogrammed instructions (i.e., software) to control the operation of the SRA 12. Accordingly, the controller 28 may comprise conventional processing capability configured to execute such preprogrammed instructions. The controller 28 additionally includes both random access memory (RAM) 28a and non-volatile memory such as read-only memory (ROM) 28b or other types of programmable memory that can be modified during operation yet retain the stored information once power is removed. The controller 28 is configured to include sufficient processing capability and resources to execute the control methodology described herein, as would be understood by one of ordinary skill in the art. The controller 28 also includes a variety of input/output (I/O) connections suitable for receiving inputs from various sensors and other inputs, as well as for producing necessary outputs, as described herein.

The controller 28 is further configured to communicate with the external control unit 22. In one embodiment, the SRA 12, through appropriate configuration of the controller 28, includes functionality to communicate in a plurality of different formats through corresponding plurality of interfaces, for example as seen by reference to U.S. Pat. No. 6,864,788 entitled "ACTUATOR CONTROLLER FOR SELECTING A COMMUNICATION LANGUAGE" issued to Crawford et al., owned by the common assignee of the present invention and hereby incorporated by reference in its entirety. The SRA 12 may be configured to receive the desired position signal 24 via the following approaches: (1) in a digital form that is transmitted in a serial fashion via a UART (Universal Asynchronous Receiver Transmitter); (2) in a digital form transmitted over a CAN network (Controller Area Network); and (3) in the form of a duty cycle of a desired position pulse width modulated (PWM) signal. In the UART and CAN approaches, the digital information that represents the commanded device position may have a value in the range of (0) to (1000). In the PWM approach, the duty-cycle range may vary in the range between (50) and (950). According to the invention, as described in greater detail below, some additional expansion of this range is provided for to allow enhanced communication between the external control unit 22 and the SRA 12. As will be described in greater detail below, the desired position signal 24 may be used by the external control unit 24 to communicate a requested positioning mode to the SRA 12—the positioning mode corresponding to how the manipulated device is positioned throughout its range of motion, including how it contacts and "pushes" against mechanical stops. As described in greater detail below, the commanded device position (0-1000) drawn from the desired position signal 24 is subsequently mapped by the controller 24 to a commanded actuator position.

The UART and CAN approaches may be 2-way communication schemes, where the SRA 12 is configured to report back an indicated position of the manipulated device whenever it receives the desired position signal 24. The PWM approach, however, is contemplated to involve only one-way communication (i.e., the SRA 12 receives the signal 24 as an input only, with no reporting back of an indicated position of the actuator).

With continued reference to FIG. 1, the motor 32 may be a conventional BLDC motor 32 having a rotor 34 coupled to a gear train 38. The sensor block 36 may include three (3) Hall-Effect sensors arranged in a conventional manner to detect the position of the rotor, as it rotates, in six different steps. The gear train 38 may be a 2-stage gear train (e.g., the motor rotor/pinion gear is coupled to an idler gear which is coupled to a sector gear having the output shaft 26). In this regard, the idler gear (not shown) may be configured to include a magnet (not shown) so that as the idler gear rotates, the magnet sweeps through an arc/range of motion. The sensor 40 may also be a Hall-Effect sensor arranged in space to detect the presence of the magnet. The overall combination of the sensor 40 and the magnet in idler gear is such that at approximately the center of the range of motion 20 of the manipulated device 18, the sensor 40 will detect the presence of the magnet and provide a corresponding signal to the controller 28. The purpose of this "center of travel" detection functionality will be described in greater detail below.

In the illustrated embodiment, the drive circuit 30 is responsive to, preferably, a plurality of drive signals, collectively the drive signal 42, for the timed production of respective phase currents 44 for energizing/commutating the various phases of the motor 32, so as to control the direction and speed of rotation of the rotor output 34. The drive circuit 30 may comprise conventional components (e.g., power transistors, etc.) known to those of ordinary skill in the art for such purpose. The controller 28 may be configured to determine and generate such drive signals. The drive signal 42 may be a fixed frequency signal that has a variable duty-cycle to define a motor pulse width modulation (MPWM) signal, for example, as seen by reference to U.S. Pat. No. 7,053,583 entitled "BRUSHLESS DC MOTOR CONTROL" issued to Hazelton, owned by the common assignee of the present invention and hereby incorporated by reference herein in its entirety. It should be understood that the MPWM drive signal 42 involved in driving the motor phases is not the same as the desired position PWM signal which may be used as one form of the input desired position signal 24.

The objects of the present invention are two-fold. First, to provide a mechanism to limit the holding force of the manipulated device against the stop. The second object is to minimize or eliminate excessive impact of the manipulated device with the mechanical stops, which if left uncontrolled, may result in damage to the gear-train.

Before proceeding to a detailed description of a method for controlling the holding force of the manipulated device against a mechanical stop, some additional background description will be set forth for greater context. Before the SRA 12 can be operated, the controller 28 needs to know the location of the mechanical stops $MSP_1$ and $MSP_2$ along the range of travel 20. In this regard, the controller 28 is configured as follows. If, upon power-up, the SRA 12 has no initial mechanical stop learn history stored in its non-volatile memory, it is configured to automatically perform a slow initial stop-learning sequence that will be referred to as a "calibration". The SRA 12 will, under the control of the controller 28, rotate its output shaft 26 and determine the location such system defined end-stops (i.e., the mechanical stops $MSP_1$ and $MSP_2$). The initial time the controller 28 performs stop-learning sequence ("calibration"), the motion is deliberately slow and motion controlled such that a controlled windup in the various mechanisms (e.g., in the coupling structure 16) occurs. For example, if fast motion is employed, the inertia of the various mechanisms may result in a situation where the motor has rotated to a position "beyond" that of the real, manipulated device (e.g., accounting for backlash, bending of bars, if any, etc.) potentially resulting in a less accurate determination of the end-stop location.

If, on the other hand, a previous "calibration" has been performed and thus the controller 28 has available for use previously-stored stop values, it is configured to automatically perform a fast, subsequent stop-learning sequence.

Figure 2:
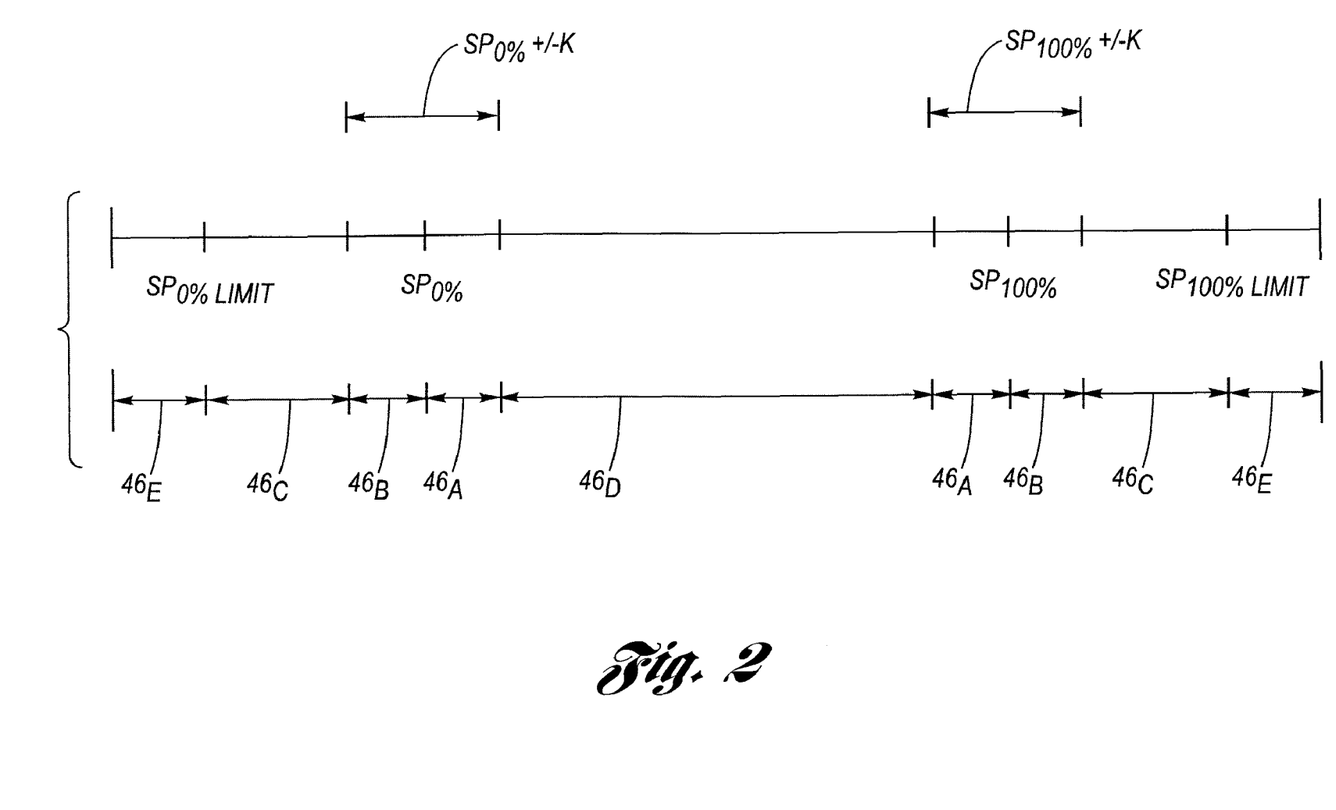
FIG. 2 is a diagram showing the range of travel of the actuator when connected to a manipulated device (load).

FIG. 2 is a range-of-travel diagram for the SRA 12 connected to load 14, which will be used in describing the initial stop-learning sequence ("calibration"). FIG. 2 shows points on the diagram that are designated $SP_{0\%}$ and $SP_{100\%}$. These are the positions of the actuator that correspond to when the SRA 12 senses that the manipulated device reaches the low and high end mechanical stops $MSP_1$ and $MSP_2$. FIG. 2 also shows a number of intervals along the diagram, designated region $46_A$ ("region A"), region $46_B$ ("region B"), region $46_C$ ("region C"), region $46_D$ ("region D") and region $46_E$ ("region E").

When the SRA 12 performs the calibration, it will cause the output shaft 26 to rotate to determine the location of the system-defined end-stops (i.e., the mechanical stops $MSP_1$ and $MSP_2$ that limit the travel of the device 18). It will also determine the span of travel 20. In one embodiment, the controller 28 is configured to make this determination by sensing when the actual position no longer follows the commanded position, which indicates that the manipulated device 18 has reached one of the mechanical stops (most likely) or has otherwise encountered friction sufficient to stop movement (possibly due to an obstruction or other abnormality). The position of the actuator 12 when the manipulated device reaches the mechanical stops $MSP_1$ and $MSP_2$ is denoted as the values $SP_{0\%}$ and $SP_{100\%}$ respectively. The positions $SP_{0\%}$ and $SP_{100\%}$ are represented in a motor count domain (more below). The positions $SP_{0\%}$ and $SP_{100\%}$ also establish a working range of 100% to which the received commanded device position is mapped.

EXAMPLE

The preferred embodiment of the SRA 12 uses a BLDC type motor for motor 32. It is known that this type of motor has a rotor comprised of a plurality of permanent magnets arranged axially and preferable equally spaced on the surface of the rotor. The preferred embodiment has a motor position sensor block 36 comprised of three Hall-effect sensors. As the rotor 34 rotates, the output signal of each Hall-effect sensor transitions between two states that for the purpose of discussion are here designated '1' or '0'. The permanent magnets and Hall sensors are oriented such that as the rotor 34 rotates only one Hall sensor output signal will transition from '0' to '1' or from '1' to '0' when any transition occurs. As the rotor 34 rotates, a certain sequence of transitions is expected. Each transition event can be considered to be a single motor step and since the sequence of the transitions is expected, the direction of the motor step can be determined. The amount of rotor 34 rotation required to cause a step to be detected is determined by the number permanent magnets that form the rotor surface. The preferred embodiment uses a ten-pole rotor, five north poles and five south poles, alternately arranged. This embodiment provides that thirty Hall-state transitions or thirty motor steps occur for every one complete revolution of the rotor 34. In other words, one motor step occurs for every twelve degrees of rotor rotation. By keeping a count of the number and direction of motor steps, the relative position of the motor can be determined.

During calibration, the non-assigned reference point along the entire range of travel (i.e., the "center of travel" point described above) is identified by sensor 40, and is arbitrarily assigned a position of (500) motor step counts. From there, the low-end stop is identified by the controller 28, by virtue of counting motor steps (i.e., counting transitions produced by the block of Hall-Effect sensors 36) downward from (500) until contact is determined, as also described above. For purposes of example, assume the position of the low end 0% stop is (330) motor step counts and so a value of (330) is assigned to $SP_{0\%}$. Likewise, assume the position of the high end 100% stop is determined to be (670) motor step counts by virtue of counting transitions upward from (500) until contact is determined. The value of (670) is assigned to $SP_{100\%}$. The span is (670) minus (330), or in other words (340) motor steps.

Before these values are established or validated, however, certain calibration diagnostics are performed. First is limit checking. FIG. 2 shows two additional points designated $SP_{0\%\_LIMIT}$ and $SP_{100\%\_LIMIT}$, which define the lowest and highest values (positions) that will be accepted by the stop-learning logic during calibration. Limit checking is performed to detect potential damage or breakage of the coupling structure 16 or the manipulated device 18. The following criteria must be satisfied for the calibration to be considered valid: (1) the value for $SP_{0\%}$ must not be below $SP_{0\%\_LIMIT}$ (i.e., not in region E); (2) the value for $SP_{100\%}$ must not be above $SP_{100\%\_LIMIT}$ (i.e., not in region E); (3) the value for $SP_{100\%}$ must not be below $SP_{0\%}$; (4) the span (i.e., region D) must be no less than a predetermined minimum; and (5) the span (i.e., region D) must be no greater than a predetermined maximum. Accordingly, at the end of the calibration, the values for the positions $SP_{0\%}$ and $SP_{100\%}$ and the non-assigned reference point are logged for future reference.

On subsequent stop-learning sequences, these stored values are used to target the motion of the output toward the stop. The "candidate" values resulting from the subsequent stop-learning sequences are compared to the values obtained from the initial stop-learning sequence ("calibration") and diagnostics are performed. While the SRA 12 is configured to dynamically update the stop-positions when it performs subsequent stop-learning sequences, there are limits. For example, to update the low-end stop position, any new candidate reading acquired during a subsequent stop-learning sequence must be within a predetermined value ("K"), plus or minus, of the initial calibration value $SP_{0\%}$. This is shown in FIG. 2 and corresponds to regions A and B above and below the initial calibration for $SP_{0\%}$. The same check is performed for the high-end stop position, and any new candidate reading acquired during a subsequent stop-learning sequence must be within a predetermined value ("K"), plus or minus, of the initial calibration value $SP_{100\%}$. This is also shown in FIG. 2 and corresponds to regions A and B. Additionally, a candidate stop position for either the low (0%) or high (100%) end that (i) falls within region E is a fatal error and will cause the stop-learning sequence to fail as being outside the limits and preferably results in a deactivation of the actuator; (ii) falls within region D is a non-fatal error but will cause the stop-learning sequence to fail as one involving insufficient travel; and (iii) falls within region C is a non-fatal error but will cause the stop-learning sequence to fail as one involving excessive travel.

As described in the background, in certain applications it is sufficient for the manipulated device 18 to merely be positioned at either of the mechanical stops $MSP_1$ and $MSP_2$, while in other applications it is desirable or necessary for the manipulated device 18 to actually be held against one of the mechanical stops with predetermined holding force. For example, this is desirable for an exhaust gas recirculation (EGR) valve application. The problem that arises, as also described in the Background, is that a characteristic back electromagnetic force (BEMF) generated by the motor when rotating is not produced when not rotating (i.e., in a stall condition, as would exist when the manipulated device 18 is held against a mechanical stop). Absent BEMF, only the resistance of the motor stator coils impede current flow, and measures are necessary to provide over-temperature protection to prevent the excessive current from damaging either the motor or surrounding packaging or components. Conventional approaches have involved positioning, without pushing, a manipulated device against the stop. However, as described above, in certain applications "close" is neither desirable nor adequate.

In one aspect of the invention, a method is provided for allowing the actuator 12 to distinguish between an external request to cause the manipulated device to push against one of mechanical stops, on the one hand, versus an external request to simply position the manipulated device at one of the mechanical stops without applying a force. In another aspect, a method of operating the actuator is provided, when "pushing" has been requested, so as to provide the needed over-temperature protection.

The first aspect (distinguishing "position" versus "push") involves a couple of steps. The first step involves receiving a desired (externally commanded) position signal (i.e., signal 24 in FIG. 1), which incorporate a first commanded device position. In addition, a plurality of value ranges of the first commanded device position correspond to a plurality of positioning modes of operation. Next, determining a second commanded device position from the first commanded device position using the relevant one of the plurality of positioning modes. As described below, the controller 28 is configured to determine into which value range the first commanded device position falls into, and identify the relevant positioning mode from that determination. The next step involves mapping the second commanded device position to a commanded actuator position. As described below, this mapping may be a linear transform from the input domain (0-1000) to the detected travel span (expressed in motor counts).

Table 1 below describes in tabular form how the controller 28 is configured to produce the second commanded device position (i.e., within the range of 0-1000) using the first commanded device position.

TABLE 1

| Internal Desired Position | PWM Percent Duty Cycle (DC) | Positioning Mode |
|---|---|---|
| Default Pos (100) | DC > (98%) | Powered default positioning |
| (1000) | (96%) < DC <= (98%) | Push against 100% stop |
| (950) | (95%) < DC <= (96%) | Position at 100% stop without pushing |
| Normal position range (50-950) | (5%) <= DC <= (95%) | Normal positioning |
| (50) | (4%) <= DC < (5%) | Position at 0% stop without pushing |
| (0) | (2%) <= DC < (4%) | Push against 0% stop |
| Default Pos (100) | DC < (2%) | Powered default positioning |

As shown generally in Table 1, the controller 28 is configured to recognize when the first commanded position falls within one of the predetermined value ranges as being indicative of a requested mode of operation ("normal mode", "position at stop mode" or "push against stop mode"). While Table 1 reflects the logic involved in this determination when the first commanded position is expressed as a duty cycle in a PWM embodiment, it should be understood that where the SRA 12 uses either of the UART or CAN approaches for communications, a digital information would itself directly define the first commanded device position, albeit in a (0-1000) range, rather than in a duty cycle percentage. For purposes of this description, any number in the (0-1000) range can be divided by 10 to obtain a corresponding, equivalent percentage for purposes of the Table 1 (e.g., a value of (30) received as digital information corresponds equivalently to a 3% duty cycle under the PWM approach). In all other respects, the description of Table 1 with regard to the PWM percent duty cycle applies equally to digital information received under the UART or CAN approaches.

With continued reference to Table 1, for example, when the desired position signal 24 has a duty cycle of 3% (or the digital information being sent has a value of (30)), then the controller 28 is configured to interpret this as a request to "push" the manipulated device 18 against the low-end (0%) stop. When the signal 24 has a duty cycle of 4% (or digital information having a value of (40)), the controller 28 interprets this a request to position the device 18 at the 0% stop without pushing, or in other words applying a holding force against the stop. This assessment performed by the controller 28 can result in any of the positioning modes described in Table 1.

The controller 28 will then translate the first commanded device position into a second commanded device position for subsequent use based on the relevant positioning mode. For example, when the controller 28 determines that first commanded device position has a value within a range in Table 1 indicative of a normal positioning mode, then the first commanded device position is translated directly (without alteration) into the second commanded device position. It is the second commanded device position that is used in subsequent processing. Alternatively, when the controller 28 determines that the first commanded device position has a value within a range in Table 1 indicative of a position without pushing mode (i.e., positioning the device 18 at one of the stops without pushing), then the first commanded device position is translated to the second commanded device position as described in the Table 1 (e.g., a suitable offset from the relevant stop, such as (50) counts, is incorporated). Further, when the controller 28 determines that the first commanded device position has a value within a range in Table 1 that is indicative of a "push" mode against one of the stops, then it is translated to the relevant one of the predetermined minimum (0) or maximum (1000) values, as the case may be. Additionally, as will be described in greater detail below, the controller 28 will implement the "push" mode by controlling the motor to position the manipulated device 18 against the appropriate stop while applying a motor effort that is limited to a predetermined maximum holding effort limit.

It should be noted that the values of (1000) as a predetermined maximum, (0) as a predetermined minimum, and the various cross-over percentages from one range to the next in Table 1 may be varied and remain within the spirit and scope of the present invention.

Once the second commanded device position, having a range between (0) and (1000), is determined using Table 1, it is then mapped to a corresponding value within an actuator position range to yield a commanded actuator position.

EXAMPLE

To extend the example previously given, the second commanded device position (source) will be in the range of between (0) to (1000) and the commanded actuator position (target) will be in the range of between (330) to (670) (in motor step counts). This may be mapped directly through a linear transformation, in which (50) maps to (330) and (950) maps to (670), and the intermediate values are linearly mapped. This equates roughly to (900) units in the source being translated to (340) units in the target, or about 3 units on the input range for every unit in the target range. Note, that values lower than (50) or higher than (950) are respectively translated to target values outside of or beyond the learned stops. In this way, requests to push against a stop can be made via such values lower than (50) or higher than (950). Once this relationship has been established, it is straightforward to translate the second (post Table 1) commanded device position into a commanded actuator position.

Figure 3:
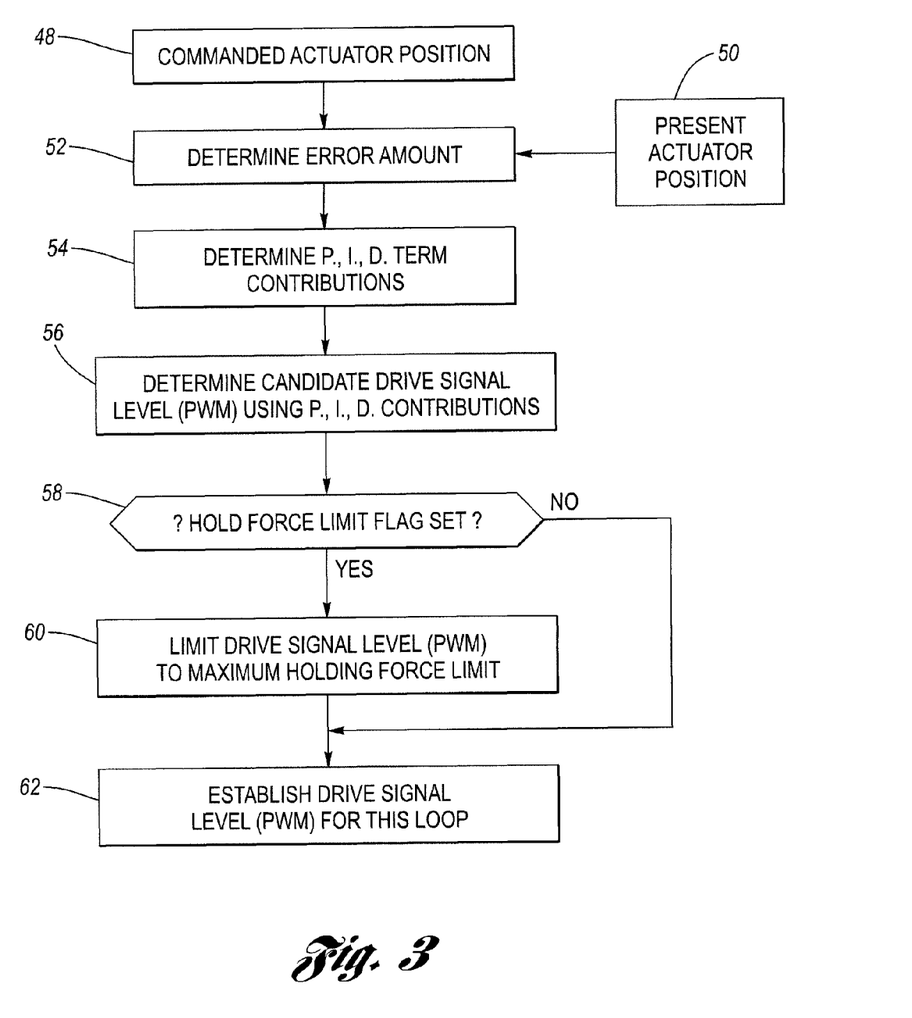
FIG. 3 is a flowchart diagram showing a method for controlling the actuator position or a holding force against travel limit positions.

FIG. 3 is a flowchart showing a method of operating an actuator according to the invention. In a preferred embodiment, the actuator position is controlled using a proportional-integral-derivative (PID) control strategy with various compensating features. When the actuator 12 is not positioning the manipulated device 18 against one of the mechanical stops $MSP_1$ and $MSP_2$, the motor effort is limited by various algorithms being executed by controller 28 to prevent overheating of the motor coils without compromising actuator transient response characteristics. However, these effort limiting means, absent the present invention, would not be sufficient to avoid overheating when the actuator 12 is positioning the manipulated device against a mechanical stop for prolonged times. The present invention provides the means of achieving the required over-temperature protection when the motor of the actuator 12 is controlled to apply a holding force against one of the mechanical stops.

The method begins in steps 48 and 50, where the commanded actuator position (method step 48) and the present (actual) actuator position (method step 50) are provided as inputs to step 52. In step 52, the controller 28 determines an error amount between the commanded actuator position and the present actuator position. The method proceeds to step 54.

In step 54, the controller 28 determines respective proportional (P), integral (I) and derivative (D) term contributions using the error amount determined in step 52. The particular gain constants for the P, I and D terms will vary from system to system but is well within the capability of one of ordinary skill in the art. The method then proceeds to step 56.

In step 56, the controller 28 determines a candidate level for the drive signal (e.g., a MPWM duty cycle) using the P, I and D contributions determined in step 54, all in accordance with a predetermined control strategy (e.g., a PID control strategy). It should be understood that other control strategies are known in the art, and may be selected for use depending on the particular, transient response characteristics desired or required for any application. The selection of an alternate control strategy (other than PID) may obviate the need to determine one or more of the P, I and D term contributions in step 54. The candidate level for the drive signal 42 is one that would be provided to the drive circuit 30 for driving the motor 32 (best shown in FIG. 1). The method then proceeds to step 58.

In step 58, the controller 28 determines whether a hold force limit flag has been set. In one embodiment, two conditions that would set the flag if satisfied are as follows: (1) the first condition involves contacting the 0% stop, where the actuator has been commanded to push against the 0% stop and has in-fact reached the 0% stop, specifically (i) the commanded actuator position is equal to or less than the 0% travel limit (i.e., corresponding to $SP_{0\%}$) and (ii) the present actuator position is equal to or less than the 0% travel limit (i.e., corresponding to $SP_{0\%}$); (2) the second condition involves contacting the 100% stop, where the actuator has been commanded to push against the 100% stop and has in-fact reached the 100% stop, specifically (i) the commanded actuator position is equal to or greater than the 100% travel limit (i.e., corresponding to $SP_{100\%}$) and (ii) the present actuator position is equal to or greater than the 100% travel limit (i.e., corresponding to $SP_{100\%}$). If the answer to this query is YES, then limiting is required and the method proceeds to step 60. However, if the answer to this query is NO, then the method branches to step 62 (the candidate level having not been limited).

In step 60, the controller 28 is configured to limit the level of the drive signal (in the illustrated embodiment, the duty cycle of the MPWM). The limit on the candidate level of the drive signal corresponds to a maximum holding effort (force) limit of the device against the stop. For example only, in an embodiment where the candidate level for the drive signal (MPWM) is represented by a byte, a maximum possible value would be (255), meaning that all of the available voltage (e.g., 14.4 volts in a typical automotive system) would be applied to the motor. A practical maximum may be a value of (248), since the maximum duty cycle should be less than 100%. A value of (128) may still cause excessive current and potential damage (e.g., melting). A value for the holding effort limit may be (65), so as to ensure that excessive heat is not generated. It should be understood that these values are exemplary only and may vary from application to application.

As described above, a second aspect of the invention relates to a method for minimizing or eliminating excessive impact of the manipulated device against either one of the mechanical stops. In this regard, and referring again to FIG. 1, the SRA 12 is configured to effect movement from an initial position $P_0$ to a final, commanded position $P_2$ in two stages. The controller 28 is configured to break up this big move into a first, relatively large move, where an intermediate position $P_1$ is temporarily designated as the "commanded position", and a second, smaller move from $P_1$ to $P_2$. Given the control effect of the preferred PID controller, the first move will provide an initially large error signal, which will effect a rapid reduction of this error for improved transient response. The second move results in a relatively small error so as to "walk" the device into the stop.

Figure 4:
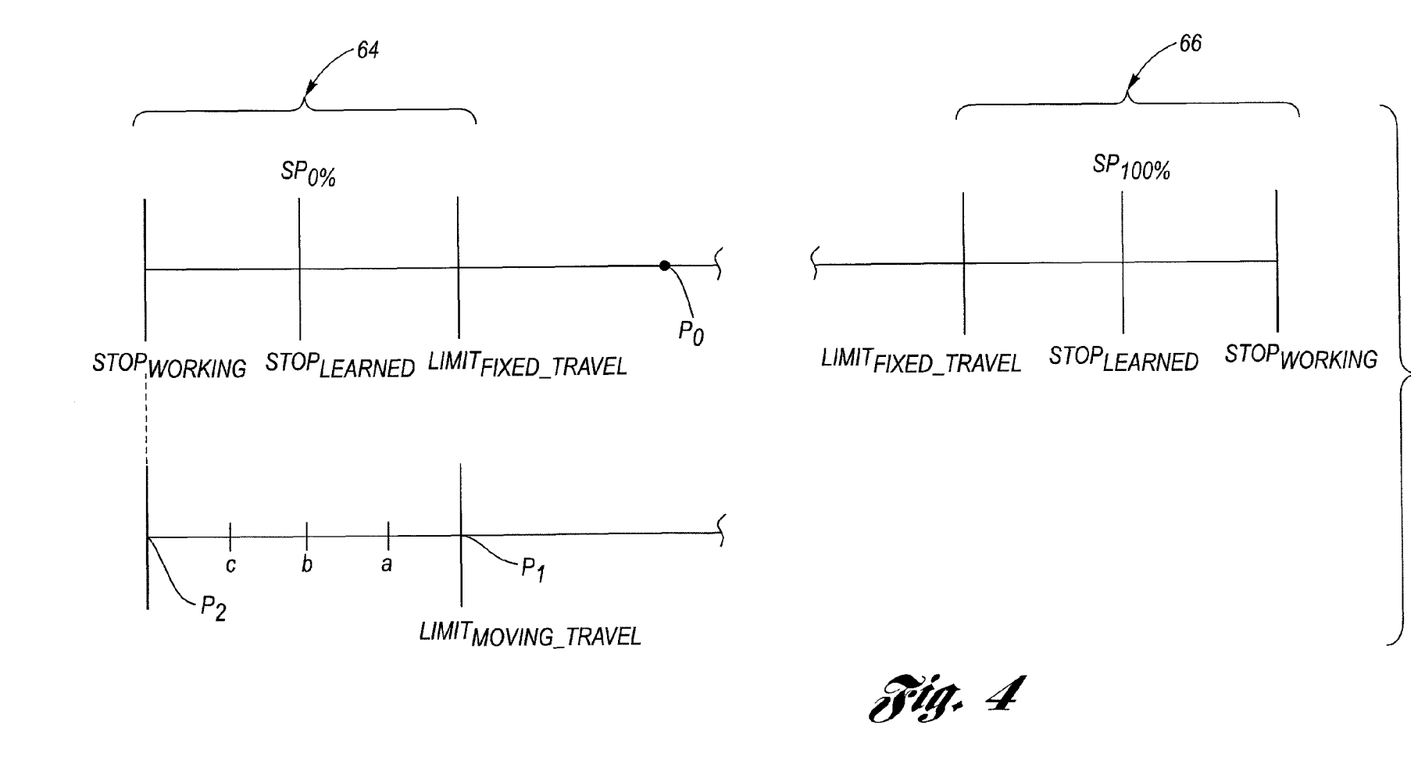
FIG. 4 is a diagram showing the range of travel of the actuator in the regions near the stops.

FIG. 4 is a diagram, exaggerated in scale, showing a range of travel in and around the mechanical stops. For frame of reference, the positions $P_0$, $P_1$ and $P_2$ noted in FIG. 1 are carried forward to FIG. 4. In particular, FIG. 4 shows a region 64 surrounding the low-end (0%) stop, designated $STOP_{Learned}$, and which, as described above, has a value, after calibration (and any subsequent learning) of $SP_{0\%}$. Region 64 also contains a reference point referred to as a the low-end (0%) fixed travel limit $LIMIT_{Fixed\_Travel}$ and a low-end (0%) working stop position $STOP_{Working}$. Likewise, FIG. 4 includes a region 66 surrounding the high-end (100%) stop, designated $STOP_{Learned}$, and which, as described above, has a value, after calibration (and any subsequent learning) of $SP_{100\%}$. Region 66 also contains a high-end (100%) fixed travel limit $LIMIT_{Fixed\_Travel}$ and a high-end (100%) working stop position $STOP_{Working}$. The low-end (0%) and high-end (100%) working stops are located a first predetermined distance (offset), in motor steps, beyond the 0% and 100% learned stop positions, respectively. The low-end (0%) and high-end (100%) fixed travel limits are, on the other hand, located a second predetermined distance "inwards" from the 0% and 100% learned stop positions, respectively.

With continued reference to FIG. 4, when the actuator 12 is commanded from a position above the low-end (0%) fixed travel limit $LIMIT_{Fixed\_Travel}$, such as position $P_0$, to a position below the low-end (0%) fixed travel limit $LIMIT_{Fixed\_Travel}$, such as $P_2$, the controller 28 is configured for limiting the internally commanded position (in motor steps) to the fixed travel limit $LIMIT_{Fixed\_Travel}$, which is at position $P_1$, to avoid impact at the 0% stop that could potentially damage the mechanism over time. Thus, between the main position points $P_0$ to $P_1$, the movement is characterized by a first transient response profile. In view of the large "error" signal between $P_0$ and $P_1$, the PID controller portion of controller 28 will cause relatively rapid reduction of the error—providing good transient response.

When the actual actuator position is below the low-end (0%) fixed travel limit, the controller 28 is configured to limit the commanded actuator position to a so-called moving travel limit, shown in the lower diagram of FIG. 4 as $LIMIT_{Moving\_Travel}$. The (0%) moving travel limit $LIMIT_{Moving\_Travel}$ has an initial value equal to the fixed travel limit $LIMIT_{Fixed\_Travel}$. In a preferred embodiment, the low-end (0%) moving travel limit is adjusted or altered at a constant time rate, or, in other words, by a constant value in each successive time interval, for example at points a, b, c in FIG. 4. The controller 28 is configured to discontinue adjusting the low-end (0%) moving travel limit $LIMIT_{Moving\_Travel}$ when the low-end (0%) moving travel limit $LIMIT_{Moving\_Travel}$ reaches the low-end (0%) working stop position $STOP_{Working}$. In one embodiment, this movement of the low-end (0%) moving travel limit $LIMIT_{Moving\_Travel}$ is implemented as a decrement of a predetermined value every predetermined time period (e.g., 24 mSec intervals). The controller 28 is configured, then, to continue to limit the commanded actuator position to the then-prevailing value of the moving travel limit $LIMIT_{Moving\_Travel}$. Through the foregoing, the controller 28 is configured to implement a second transient response profile between position $P_1$ to position $P_2$, which, in-effect, "walks" the manipulated device 18 into the mechanical stop.

When the commanded actuator position is changed from a position below the low-end (0%) learned stop position $STOP_{Learned}$, such as position $P_2$, to a position above the low-end (0%) fixed travel limit $LIMIT_{Fixed\_Travel}$, such as position $P_0$, then the controller 28 is configured to reset the low-end (0%) moving travel limit $LIMIT_{Moving\_Travel}$ to its initial value, namely, equal to the low-end (0%) fixed travel limit $LIMIT_{Fixed\_Travel}$. Once above the low-end (0%) fixed travel limit, the controller 28 will not limit the commanded actuator position.

The operation of actuator 12 when in the region 66 surrounding the high-end (100%) stop may be substantially a mirror image of the operation in the low-end (0%) region 64. It should be understood that minor variations may be desirable or required depending on differences between the 0% stop end and the 100% stop end.

When the actuator 12 is commanded from a position below the high-end (100%) fixed travel limit $LIMIT_{Fixed\_Travel}$ to a position above the high-end (100%) fixed travel limit $LIMIT_{Fixed\_Travel}$, the controller 28 is configured for limiting the internally commanded position (in motor steps) to the high-end (100%) fixed travel limit $LIMIT_{Fixed\_Travel}$ to avoid impact at the 100% stop that could potentially damage the mechanism over time. This movement is characterized by the first transient response profile, as described above.

When the actual actuator position is above the high-end (100%) fixed travel limit, the controller 28 is configured to limit the commanded actuator position to the high-end moving travel limit (not shown). The (100%) moving travel limit $LIMIT_{Moving\_Travel}$, has an initial value equal to the high-end (100%) fixed travel limit $LIMIT_{Fixed\_Travel}$. In a preferred embodiment, the high-end (100%) moving travel limit is adjusted or altered at a constant time rate, or, in other words, by a constant value in each successive time interval. The controller 28 is configured to discontinue adjusting the high-end (100%) moving travel limit $LIMIT_{Moving\_Travel}$ when the high-end (100%) moving travel limit $LIMIT_{Moving\_Travel}$ reaches the high-end (100%) working stop position $STOP_{Working}$. In one embodiment, this movement of the high-end (100%) moving travel limit $LIMIT_{Moving\_Travel}$ is implemented as an increment of a predetermined value every predetermined time period (e.g., 24 mSec intervals). The controller 28 is configured, then, to continue to limit the commanded actuator position to the then-prevailing value of the moving travel limit $LIMIT_{Moving\_Travel}$. Through the foregoing, the controller 28 is configured to implement a second transient response, which, in-effect, "walks" the manipulated device 18 into the mechanical stop.

When the commanded actuator position is changed from a position above the high-end (100%) learned stop position $STOP_{Learned}$ to a position below the high-end (100%) fixed travel limit $LIMIT_{Fixed\_Travel}$, then the controller 28 is configured to reset the high-end (100%) moving travel limit $LIMIT_{Moving\_Travel}$ to its initial value, namely, equal to the high-end (100%) fixed travel limit $LIMIT_{Fixed\_Travel}$. Once below the high-end (100%) fixed travel limit, the controller 28 will not limit the commanded actuator position.

Preferably, the first aspect of the invention providing a method for limiting the holding force against travel limit positions is used in combination with the second aspect providing a method for minimizing or eliminating excessive impact.

It should be understood that the controller 28 as described above may include conventional processing apparatus known in the art, capable of executing pre-programmed instructions stored in an associated memory, all performing in accordance with the functionality described herein. That is, it is contemplated that the processes described herein will be programmed in a preferred embodiment, with the resulting software code being stored in the associated memory. Implementation of the present invention, in software, in view of the foregoing enabling description, would require no more than routine application of programming skills by one of ordinary skill in the art. Such an electronic controller may further be of the type having both ROM, RAM, a combination of non-volatile and volatile (modifiable) memory so that the software can be stored and yet allow storage and processing of dynamically produced data and/or signals.

It is to be understood that the above description is merely exemplary rather than limiting in nature, the invention being limited only by the appended claims. Various modifications and changes may be made thereto by one of ordinary skill in the art, which embody the principles of the invention and fall within the spirit and scope thereof.

The invention claimed is:

1. A method of operating an actuator having a motor wherein the actuator is coupled to a manipulated device that is configured to travel through a range of motion limited by first and second mechanical stops located at opposing low and high ends of such range, said method comprising the steps of:
   determining an error signal between a commanded actuator position and a present actuator position;
   determining a candidate level for a drive signal for use in driving the motor as a function of the determined error signal and a predetermined control strategy;
   limiting the candidate level of the drive signal level so as to not exceed a predetermined maximum level when a holding force limit flag is set, the predetermined maximum level corresponding to a predetermined holding effort of the manipulated device against one of the mechanical stops; and
   controlling the drive signal driving the motor at the predetermined maximum level such that the actuator pushes the manipulated device against one of the mechanical stops with the predetermined holding force after reaching the mechanical stop.

2. The method of claim 1 further including the steps of:
   receiving a desired position signal indicating a first commanded device position where a plurality of value ranges of the first commanded device position correspond to a plurality of positioning modes of operation;
   determining a second commanded device position from the first commanded device position based on the first commanded device position and a selected one of the plurality of positioning modes; and
   mapping the second commanded device position to a commanded actuator position.

3. The method of claim 2 wherein the step of determining the second commanded device position includes the sub-steps of:
   setting the second commanded device position to a predetermined minimum when the first commanded device position indicates a request for a first one of the positioning modes where the manipulated device contacts and pushes against the first mechanical stop;
   setting the second commanded device position to a predetermined maximum when the first commanded device position indicates a request for a second one of the positioning modes where the manipulated device contacts and pushes against the second mechanical stop;
   setting the second commanded device position so as to correspond to the first commanded device position when the first commanded device position indicates a third one of the positioning modes for normal positioning.

4. The method of claim 3 wherein the step of determining the second commanded device position further includes the sub-steps of:
   setting the second commanded device position to a first value greater than the predetermined minimum when the first commanded device position indicates a request for a fourth one of the positioning modes where the manipulated device is positioned at but not pushing against the first mechanical stop; and
   setting the second commanded device position to a second value less than the predetermined maximum when the first commanded device position indicates a request for a fifth one of the positioning modes where the manipulated device is positioned at but not pushing against the second mechanical stop.

5. The method of claim 3 further including the steps of:
   learning a first stop position of the actuator corresponding to when the manipulated device is at the first mechanical stop;
   learning a second stop position of the actuator corresponding to when the manipulated device is at the second mechanical stop.

6. The method of claim 5 further including the step of:
   setting the holding force limit flag when the commanded actuator position is equal to or lower than the learned first stop position and a present actuator position is equal to or lower than the learned first stop position.

7. The method of claim 5 further including the step of:
   setting the holding force limit flag when the commanded actuator position is equal to or greater than learned second stop position and a present actuator position is equal to or greater than the learned second stop position.

8. The method of claim 1 wherein said step of determining the level of the candidate drive signal includes the sub-step of:
   determining a first term proportional to the error signal, a second term that is a time-based integral of the error signal and a third term that is a time-based derivative of the error signal wherein the predetermined control strategy is defined by a PID control strategy.

9. A method of operating an actuator having a motor wherein the actuator is coupled to a manipulated device that is configured to travel through a range of motion limited by first and second mechanical stops located at opposing low and high ends of such range, said method comprising the steps of:
   learning first and second stop positions of the actuator corresponding to when the manipulated device is at the first and second mechanical stops, respectively;
   setting first and second fixed travel limits above and below respectively the first and second learned stop positions;
   limiting the commanded actuator position to one of the first and second fixed travel limits when the commanded actuator position is beyond one of the first and second travel limits and until the actuator position reaches the corresponding fixed travel limit;
   determining an error signal between the limited commanded actuator position and a present actuator position and moving the actuator as a function of the error signal and a predetermined control strategy; and
   controlling the drive signal driving the motor at a predetermined maximum level such that the actuator pushes against one of the mechanical stops with a predetermined holding force after reaching the mechanical stop.

10. The method of claim 9 further including the steps of:
    defining first and second moving travel limits having initial values corresponding to the first and second fixed travel limits;
    identifying one of the first and second moving travel limits based on a direction of a commanded actuator position;
    and wherein said limiting steps includes the sub-step of:
    limiting the commanded actuator position to the identified one of the moving travel limits when the commanded actuator position is beyond the corresponding fixed travel limit.

11. The method of claim 10 wherein said predetermined control strategy is a PID control strategy and wherein said limiting step is configured to provide a first transient response profile when the moving travel limits have initial values.

12. The method of claim 11 further comprising the steps of:
adjusting said identified one of the first and second moving travel limits to an updated value away from its associated fixed travel limit towards its learned stop position.

13. The method of claim 12 wherein said limiting step is configured to provide a second transient response profile when the identified moving travel limit has the updated value, said second response profile being configured to minimize or eliminate excessive impact when the manipulated device contacts one of the mechanical stops.

14. The method of claim 13 wherein said adjusting step includes the sub-steps of:
altering the identified moving travel limit at a constant rate over time.

15. The method of claim 14 further including the step of:
setting first and second working stop positions associated with the first and second learned stop positions, and wherein said moving travel limit adjusting step is discontinued when the identified moving travel limit reaches a corresponding one of the first and second working stop positions.

* * * * *